Dec. 14, 1954     L. T. ZATKO     2,696,740
HUBBED SHEET METAL PULLEY
Filed Feb. 18, 1950
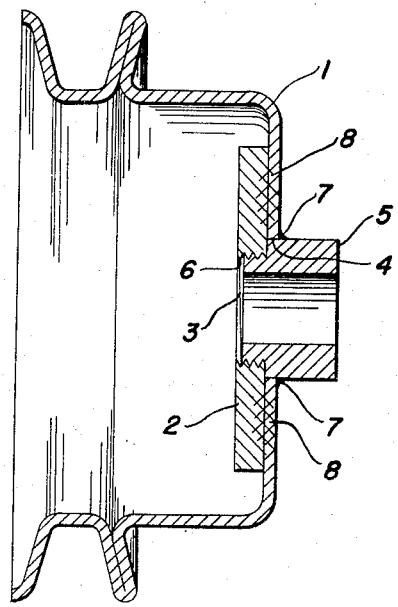
INVENTOR
*LESTER T. ZATKO*
BY
ATTORNEYS

United States Patent Office 2,696,740
Patented Dec. 14, 1954

2,696,740

HUBBED SHEET METAL PULLEY

Lester T. Zatko, Euclid, Ohio

Application February 18, 1950, Serial No. 144,992

1 Claim. (Cl. 74—230.8)

This invention relates to improvements in pulley hubs and, more particularly, to improvements in hubs from sheet metal pulleys, especially sheet metal V-belt pulleys.

Sheet metal V-belt pulleys are widely employed because they are considerably less expensive and lighter than cast pulleys of equivalent strength. A substantial amount of the savings which might appear to be possible in employing sheet metal pulleys has been lost, heretofore, in the expense of the hubs to which the webs of the sheet metal pulleys have been secured by bolts, spot-welds, or the like. Previously the hubs for sheet metal V-belt pulleys were most commonly castings comprised of a sleeve portion drilled for mounting on the pulley shaft and an integral web or flange faced at a plurality of points and drilled to receive bolts for mounting. Such cast hubs were not only relatively expensive but had a serious fault in that the rather coarse tolerances in the bolts and bolt-holes permitted eccentricities which were major causes of belt-wear, vibrations, bearing wear, and cracking of the pulley at the root of the V due to fatiguing of the metal under repetitive stresses.

An alternative prior art hub for sheet metal V-belt pulleys comprised a sleeve and an integral wide flange machined out of bar stock having a diameter equal to the diameter of the flange. This construction permitted the hub and pulley web to be assembled in a welding jig so that the hub flange and pulley web could be spot-welded together, assuring precise concentricity of the pulley groove and simplifying assembly costs; the screw-machinery costs and loss of expensive bar stock metal in boring the hub and machining out the flange more than offset the savings in assembly costs and, therefore, relegated this construction to extremely high-speed pulleys where the necessity for precise concentricity warranted the premium in costs involved.

It is the object of this invention to provide a pulley hub for sheet metal V-belt pulleys which is less expensive than the prior art cast pulley hubs, minimizes metal losses and machinery costs while providing the concentricity and strength of prior art hubs machined out of bar stock. The manner of obtaining this desirable construction and other advantages of this invention are disclosed in the following specification, claims, and the drawing, in which is shown an axial section through a hubbed sheet metal pulley made according to this invention.

As shown in the drawing the pulley 1 is preferably a stamped sheet metal pulley made according to the disclosure of U. S. Patent No. 2,493,053, granted January 3, 1950 to Frank Zatyko for "Method of Making Pulleys." in order that the resultant pulley will combine the strength inherent in the uniform section of the Zatyko type of pulley with the strength and concentricity permitted by the present hub construction. It is to be understood, however, that the improvement in strength provided by the present hub construction actually will provide a more marked improvement in the spun type of sheet metal pulley, in which the metal is frequently over-worked and thinned at the root of the V and is thus more likely to fail if mounted with a very slight eccentricity on prior art hubs.

The hub construction per se comprises a spider 2 of stamped sheet metal having a central bore 3 punched simultaneously with the blanking out of the spider 2 in a punch or stamping press. The periphery of the spider 2 may be of any suitable shape, i. e. circular, hexagonal, or fluted, as desired. After being blanked out, the bore 3 is then tapped to provide the screw-threads 6, which are preferably of an opposite hand to the direction of the torque on the pulley. With the threaded bore 3 as the guide for the spider 2, the spider and pulley are preferably united by means of spot welds 8 in a spot-welding jig which insures permanent concentricity. It is to be noted that the bore 3 of the spider 2 is preferably slightly smaller than the punched bore 4 in the web of the pulley 1 in order to provide clearance for the threads 6 and also to allow for possible eccentricity of the punched bore 4. The balance of the hub is a short sleeve 5 of heavy-walled tubing slightly larger than the bore 4. One end of the sleeve 5 is suitably threaded in a screw machine to provide threads mating with threads 6 and also a small shoulder which engages the pulley web around the bore 4. By providing that the threads 6 are of an opposite hand to the torque on the pulley, tightening the hub sleeve 5 against the pulley web, as with an airhammer driven spanner, provides a substantially permanent connection between the hub sleeve 5 and the spider 2. In order to insure that the connection between the pulley 1 and the sleeve 5 is permanent, however, a furnace braze 7 is applied to the shoulder between the pulley web and sleeve 5, effecting a sweated fusion of these members. With the furnace braze 7, the pulley may be used where the applied torque and band of the threads 6 are the same, due to the fact that brazing compound will tend to sweat into the capillary space in the threaded connection of the sleeve 5 and spider 2.

The foregoing pulley construction is stronger than cast or machined pulley hubs of equivalent weight. The gauge of the spider 2 is selected so that it will provide an adequate depth of section at the hub to transmit the torque which may be carried without distortion by the web of the pulley 1 and, with such a gauge, an adequate number of threads will be provided to secure the sleeve 5 in the spider 2. In addition to or in place of the furnace braze, the threads 6 may be sweat soldered or brazed to the sleeve 5.

As pointed out above, the invention is suitable for any type of sheet metal pulley, regardless of the method of forming the metal of the pulley, and is obviously not limited to a pulley having a section of the particular embodiment disclosed.

What is claimed is:

A hubbed sheet metal pulley comprising an integrally formed sheet metal pulley body comprising a flat radial web portion and a rim portion extending to one side of the plane of said radial web portion, said rim portion being formed to define a circumferential pulley groove, a stamped sheet metal spider having a flat side and a threaded axial bore, said flat side being positioned against said flat radial web portion and being united therewith into a unitary structure in which said groove and said threaded axial bore are concentric, a substantially central opening in said flat radial web portion, and an axial sleeve of a diameter substantially equal to that of said central opening and having a reduced end portion, said sleeve being fitted in said central opening and said reduced end portion being threaded in said spider bore.

References Cited in the file of this patent

UNITED STATES PATENTS

| Number | Name | Date |
|---|---|---|
| 412,155 | Anderson | Oct. 1, 1889 |
| 2,087,907 | Gottlieb et al. | July 27, 1937 |
| 2,092,571 | Cole | Sept. 7, 1937 |

FOREIGN PATENTS

| Number | Country | Date |
|---|---|---|
| 535,637 | Great Britain | Apr. 16, 1941 |